United States Patent
Vatland

(10) Patent No.: US 7,590,534 B2
(45) Date of Patent: Sep. 15, 2009

(54) METHOD AND APPARATUS FOR PROCESSING VOICE DATA

(75) Inventor: Danny James Vatland, Chanhassen, MN (US)

(73) Assignee: Healthsense, Inc., Mendota Heights, MN (US)

( * ) Notice: Subject to any disclaimer, the term of this patent is extended or adjusted under 35 U.S.C. 154(b) by 702 days.

(21) Appl. No.: 10/144,436

(22) Filed: May 9, 2002

(65) Prior Publication Data

US 2003/0212554 A1    Nov. 13, 2003

(51) Int. Cl.
*G10L 15/00* (2006.01)

(52) U.S. Cl. .................. 704/235; 704/270; 704/275

(58) Field of Classification Search ............... 704/235, 704/275, 270
See application file for complete search history.

(56) References Cited

U.S. PATENT DOCUMENTS

| | | | | |
|---|---|---|---|---|
| 5,231,670 A | * | 7/1993 | Goldhor et al. | 704/275 |
| 5,530,950 A | | 6/1996 | Medan et al. | 379/67 |
| 5,644,334 A | * | 7/1997 | Jones et al. | 345/419 |
| 5,983,187 A | * | 11/1999 | Haddock | 704/275 |
| 6,122,614 A | * | 9/2000 | Kahn et al. | 704/235 |
| 6,175,820 B1 | | 1/2001 | Dietz | 704/235 |
| 6,278,772 B1 | | 8/2001 | Bowater et al. | 379/88.13 |
| 6,332,122 B1 | | 12/2001 | Ortega et al. | 704/270 |
| 6,345,252 B1 | | 2/2002 | Beigi et al. | 704/272 |
| 6,813,603 B1 | * | 11/2004 | Groner et al. | 704/235 |
| 6,834,264 B2 | * | 12/2004 | Lucas et al. | 704/235 |
| 6,934,756 B2 | * | 8/2005 | Maes | 709/227 |
| 2002/0143533 A1 | * | 10/2002 | Lucas et al. | 704/235 |
| 2002/0143549 A1 | * | 10/2002 | Kontonassios | 704/270 |
| 2003/0097253 A1 | * | 5/2003 | Hoi | 704/9 |

OTHER PUBLICATIONS

Seldon, Tom "McGraw-Hill Encyclopedia of Networking & Telecommunications" 2001, pp. 669-672, pp. 1213-1218.*
Stone, Harold "Microcomputer Interfacing" 1982 Addison-Wesley Publishing Company, Inc. pp. 3-4.*
IBM Voice Middleware Systems; IBM WebSphere Voice Server for Transcription, 4 pages.
IBM, Introducing the IBM WebSphere Voice Server for Transcription, An IBM White Paper, 14 pages.

\* cited by examiner

*Primary Examiner*—Daniel D Abebe
(74) *Attorney, Agent, or Firm*—Brooks, Cameron & Huebsch, PLLC

(57) ABSTRACT

One aspect of the present disclosure is a device for processing voice data associated with an application program. The application program has a form therein for entering voice data. The application program provides an identifier associated with voice data for identifying the form the voice data is associated with. The device includes an input portion for receiving voice data and identifier information from the application program. Also included is a translation portion for translating voice data to text data. The translation portion receives the voice data from the input portion and translates the voice data to text data. Also included is an output portion for sending output text data and the identifier information to the application program for association with the form.

11 Claims, 6 Drawing Sheets

FIG. 8

METHOD AND APPARATUS FOR PROCESSING VOICE DATA

BACKGROUND OF THE INVENTION

The present invention relates to a method and apparatus for processing voice data for use in a variety of voice applications such as conversion of voice data into text data.

There is an ever-increasing need for improved productivity in a wide variety of professions. In those professions where productivity is particularly crucial, many professionals make use of techniques for converting voice data into text data. By relieving the professionals of having to enter keystrokes using a keyboard, these professionals are able to devote their time and energy to higher valued uses. In addition, freeing these professionals from the keyboard is important in many professions that require significant traveling or fieldwork.

Historically, the conversion of voice data to text data has been accomplished using a manual process. This process requires the professional to dictate, sometimes using a small recorder to capture their voice to tape or to dictate directly to a skilled assistant. The skilled assistant then transcribes or types entering this information into a word processing system to convert the voice information either on tape or directly spoken to the assistant to create this text data or text document.

More recently, speech to text applications have evolved, which convert spoken language into text form which is then made accessible to the user in some form of a word processing system. Some examples of the implementation of voice recognition technology are Dragon™ (a product of Scansoft) and ViaVoice™ (a product of International Business Machines Corporation (IBM)).

Each of these techniques for converting voice data to text data has strengths and weaknesses. Manual transcription can be very accurate but tends to be expensive. In contrast, the speech to text applications tend to be relatively inexpensive but this technique tends to be less accurate than manual transcription.

The conversion of speech to text is used in a wide variety of applications. Some of these applications include medical applications where physicians must document examinations for ongoing clinical care. Because of the large number of patients, a typical doctor is required to see everyday, physicians frequently dictate notes regarding patient care. In addition, physicians frequently dictate e-mails to other physicians as well as e-mails to patients. Another application where conversion of speech to text is frequently used is in legal applications. Frequently, lawyers dictate letters and memos as well as substantive legal documents, such as agreements and legal briefs to save time.

There is an ever present need for systems to handle the conversion of voice data to text data in a flexible manner that allows use of a technique for converting voice data into text data that is well suited for the particular application. In addition, these systems for converting voice data to text data should be cost effective and seamless for the user so as to provide ease of use. Finally, these systems should be capable of providing conversion of speech data to text data in a rapid fashion, when required by the application.

SUMMARY OF THE INVENTION

One aspect of the exemplary embodiment of the present invention is a device for processing voice data associated with an application program. The application program has a form therein for entering voice data. The application program provides an identifier associated with voice data for identifying the form the voice data is associated with. The device includes an input portion for receiving voice data and identifier information from the application program. Also included is a translation portion for translating voice data to text data. The translation portion receives the voice data from the input portion and translates the voice data to text data. Also included is an output portion for sending output text data and the identifier information to the application program for association with the form.

Another aspect of the present invention is a system for processing voice data. The system includes a processing device running an application program. The processing device has an input device for receiving a voice signal and converting that voice signal into voice data. Included, is an application processing device configured for Internet connection. The application processing device has a data link for receiving voice data in real time from the processing device. Also included is a voice processing device configured for Internet connection whereby voice data is passed in real time from the application processing device to the voice processing device.

Yet another aspect of the present invention is a device for collecting data. The device includes a display portion for displaying a form having an insertion portion for inserting information therein. The insertion portion is selectable for capturing voice data from an input device. Also included is a control portion for tagging the voice data with an identifier for associating the voice data to the form.

BRIEF DESCRIPTION OF THE DRAWINGS

FIG. 8 depicts an exemplary form that is displayed by the application to illustrate the insertion of the text data into the form.

DETAILED DESCRIPTION OF THE EXEMPLARY EMBODIMENT

Figure 1:
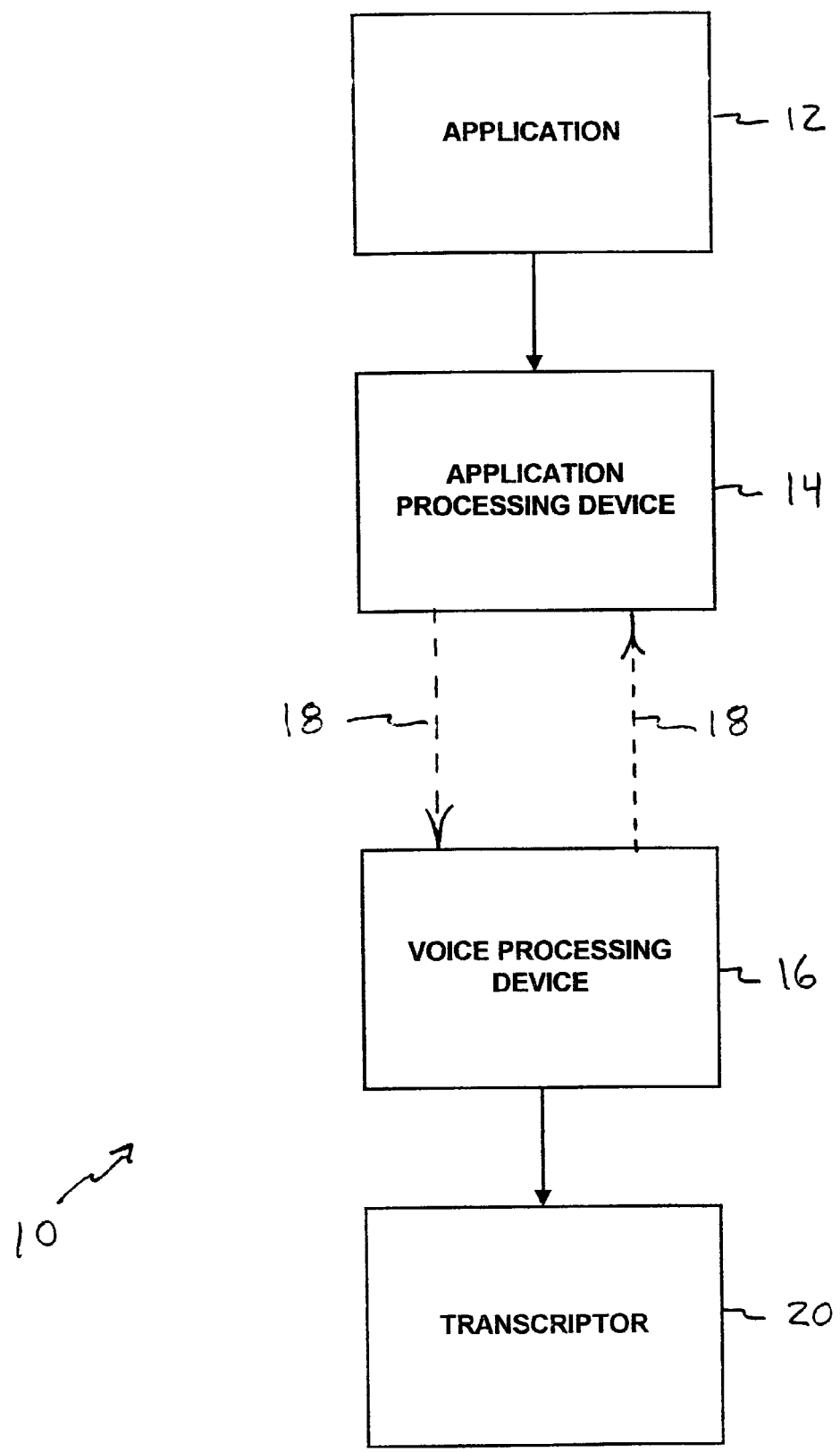
FIG. 1 is a block diagram representing an exemplary system of the present invention for processing voice data.

FIG. 1 represents a system 10 of an exemplary embodiment of the present invention for processing voice data. The system 10 includes an application 12 for generating voice data that is associated with a form. The voice data is provided to an application processing device 14, which in turn passes the voice data to a voice processing device 16 via a data link 18. The voice processing device 16 passes the voice data to a transcriptor 20 that converts the voice data into text data. The text data is then returned to the voice processing device 16, which then passes the text data to the application processing device 14 via the data link 18. The application processing device 14 provides the text data back to the application 12 whereupon the text data is associated with the form.

The method and apparatus of the exemplary embodiment of the present invention 10 provides a system for converting voice data into text data in a manner that is highly flexible, scalable and seamless to the user of the application 12. In one exemplary embodiment, a plurality of applications 12 are supported by each application processing device 14. In addition, the voice processing device 16 is capable of supporting a plurality of application processing devices 14. By increasing the application processing devices 14 and applications 12, the system 10 can be configured to support a wide variety of different requirements.

Figure 8:
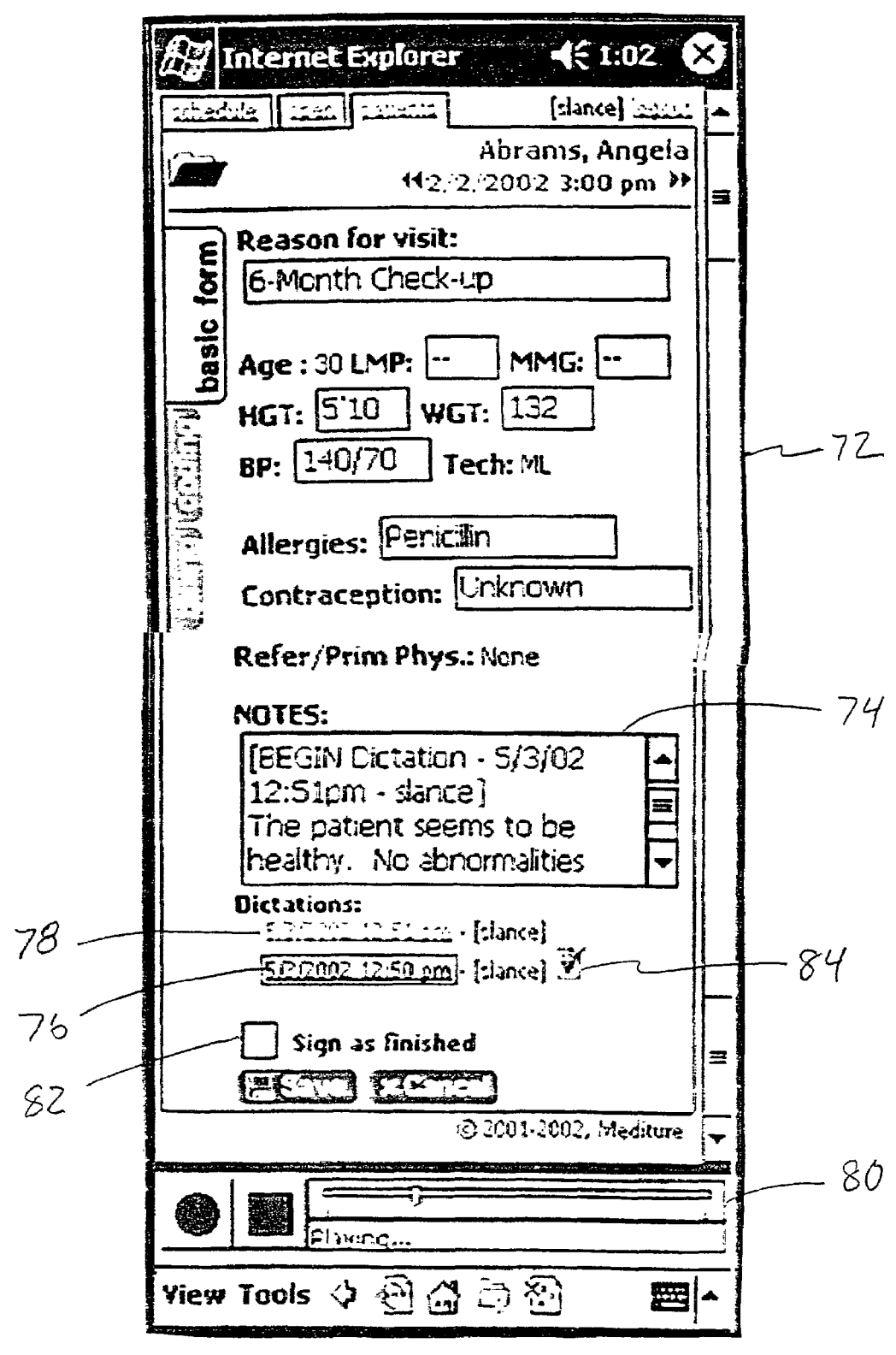

Another aspect of the exemplary embodiment, is that voice data is entered directly into a form, as will be discussed in more detail with respect to FIG. 8. Entering voice data into a form, makes use of established workflow as defined by the forms. In addition, entering form data using dictation is highly efficient. For example, a physician entering data into a patient's chart subsequent to examination of the patient. The physician examines the patient's chart using the application 12 whereupon the physician selects portions of the chart and dictates or speaks into the input device associated with the application 12 to capture voice data. This voice data is assigned identification information for associating the voice data with the particular portion of the patient's chart that voice data was intended. As will be discussed, the text data, which is returned from the voice processing device 16, is packaged with the identification information so that the application 12 can insert the text in the proper position within the patient's chart. This technique provides great ease of use for the user of application 12, thereby improving efficiency and reducing training time and training costs.

Figure 2:
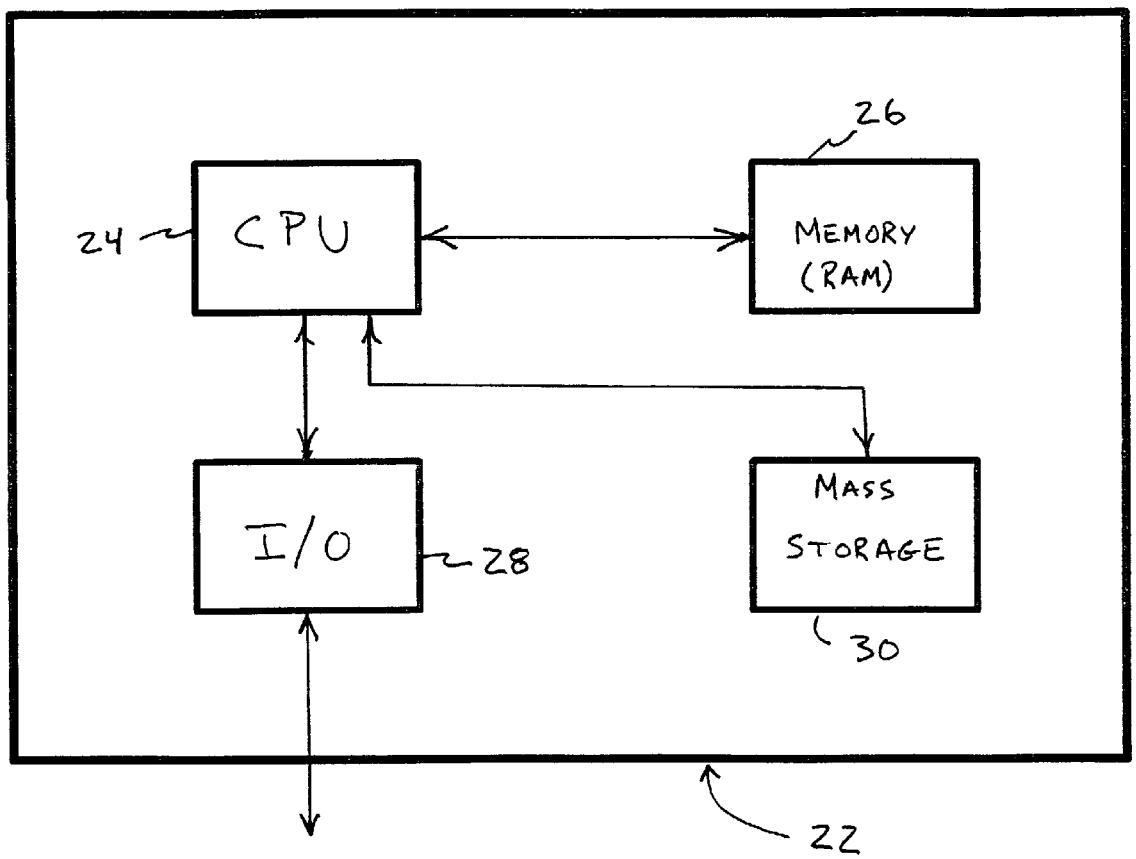
FIG. 2 is a simplified block diagram of a programmable processor of the type used in various components of the exemplary embodiment shown in FIG. 1.

In the exemplary embodiment, application 12 is a programmable device that executes software or firmware that is stored in memory. FIG. 2 represents a simplified programmable processing device 22 such as used for application 12. The programmable processing device 22 includes a central processing unit 24 for processing instructions, which are stored in a memory 26. The central processing unit sends and receives information from the programmable processing device 22 via an input output portion 28. A mass storage 30 is provided for storing data and other information.

In one exemplary embodiment, the application 12 is a personal computer or handheld processing device such as a Personal Digital Assistant (PDA). Two examples of a PDA include the IPAQ or the Jornada, each manufactured by the Hewlett-Packard Company in Palo Ato, Calif. The PDA typically includes a display, a microphone for inputting voice data and a linking device such as a wireless networking device for transferring information from the application 12 to the application processing device 14 in a wireless manner. One such wireless connectivity devices is a radio frequency transmission device, which transmits data using the 80211B protocol commonly, referred to WI-FI. Alternatively, the linking device can be a variety of devices for exchanging information between the application 12 and the application processing device 14 such as an internet data connection or satellite link for exchanging information.

The application processing device 14 in the exemplary embodiment is a programmable processing device 22 similar in basic structure to the programmable device shown in FIG. 2. The application processing device 14 executes software or firmware that is stored on the application processing device 14. The application processing device 14 in addition to exchanging information with the application 12 also exchanges information with the voice processing device 16. In the exemplary embodiment, information is exchanged between the voice processing device 16 and the application processing device 14 by way of an Internet connection. In this exemplary embodiment, each of the application processing device 14 and the voice processing device 16 make use of a protocol for exchanging information in a decentralized, distributed environment. In this exemplary embodiment, a Simple Object Access Protocol (SOAP) is used for the exchange of information.

The voice processing device 16 in the exemplary embodiment is a programmable processing device 22 that is similar in basic structure to the programmable device shown in FIG. 2. The voice processing device 16 is controlled by software stored on the programmable device, which implements the exchange of information with the application processing device 14 using a protocol such as the SOAP protocol. The application processing device 14 and voice processing device 16 can, alternatively, use other protocols for exchanging information via the Internet 18. In addition, the application processing device 14 and the voice processing device 16 can use other medium for transmitting information there between such as satellite link, telephone line or any other technique for transferring data therebetween.

In the exemplary embodiment, the application processing device 14 acts as a client and the voice processing device 16 acts as a server in a client/server relationship. As a server, the voice processing device 16 will never initiate a communication with the application processing device 14. In this relationship, the application processing device 14 must initiate connection with the voice processing device 16 for exchanging information therebetween. Once the transaction is completed, the application processing device 14 terminates communication with the voice processing device 16. The application processing device 14 then must poll the voice processing device 16 periodically to determine if the voice processing device 16 has information to transfer to the application processing device 14. It is difficult to establish communication to an application processing device 14 because of the use of firewalls and proxy servers for security. The use of a client/server relationship allows the exchange of information with application processing devices 14 that have security features such as firewalls. For the case where the application processing device 14 does not use security features a client/client relationship can exist between each of the voice processing device 16 and application processing device 14 whereupon each can initiate communication with the other as soon as the situation dictates.

The transcriptor 20 makes use of a wide variety of techniques for converting speech data into text data. For example, the transcriptor 20 in one exemplary embodiment is a manual transcription process. The voice processing device 16 passes the voice data to the transcriptor 20 who then manually types in the text data while listening to the voice data. The voice data is passed to the transcriptor 20 using one of a variety of techniques such as an Internet connection, phone line, radio frequency link or some other technique for passing voice data from the voice processing device 16 to the transcriptor 20.

Alternatively, the transcriptor 20 is a speech to text application for converting the voice data to text data. This speech to text application can be one of a variety of speech to text applications such as Dragon™ of Via Voice™ previously mentioned. This speech to text application can be running on the voice processing device 16 or alternatively, can be run on a programmable processor such as shown in FIG. 2.

Once the transcriptor 20 converts the voice data to text data, the text data is returned to the voice processing device 16 for posting to the application processing device 14 and ultimately back to the application 12. Further details of the technique for passing data from the application 12 to the transcriptor 12 and back again will now be discussed with respect to FIGS. 3 through 6.

Figure 3:
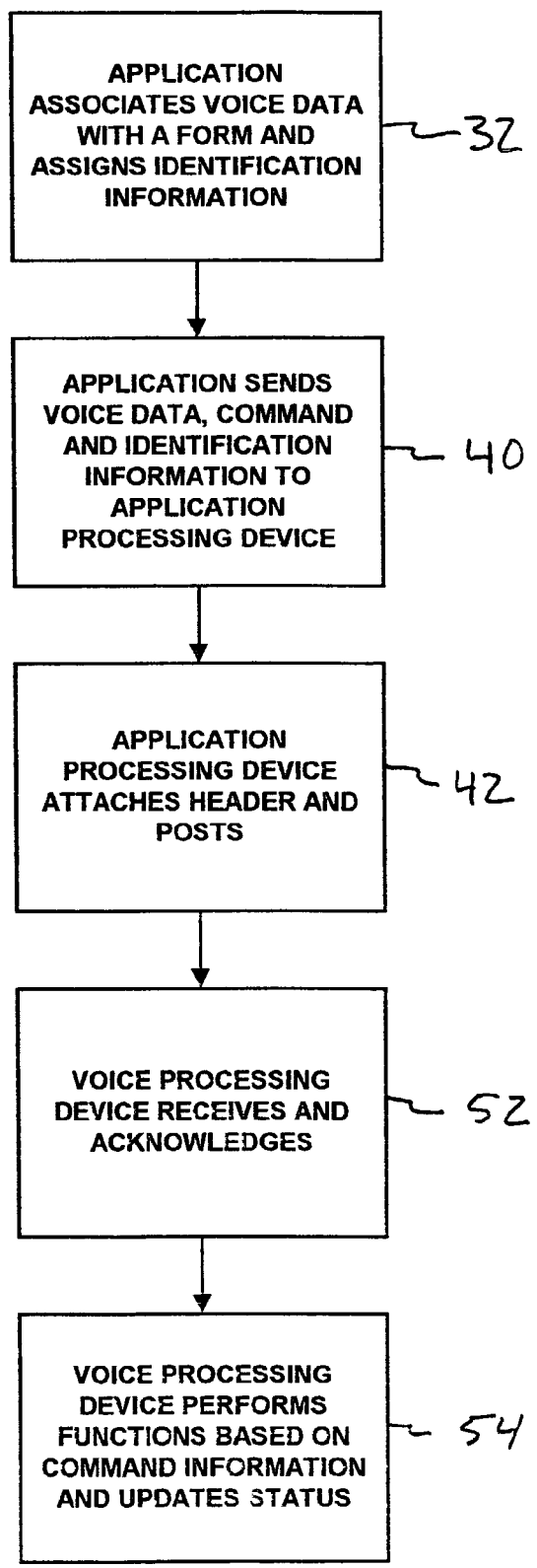
FIG. 3 is a simplified flow diagram representing a method of the exemplary embodiment for passing voice data from an application to a voice processing device shown in FIG. 1.

FIG. 3 is a simplified flow diagram depicting the method for passing voice data from the application 12 to the voice processing device 16. The process begins with the application 12 associating voice data with a form and assigning identification information to that voice data so that the application 12 can associate that voice data with the particular speaker and form for which the voice data corresponds. In addition, the application 12 assigns command information to the voice data for specifying instructions for handling the voice data. The command information may specify that the voice data is to be converted to text data and returned. Other types of commands may include a variety of types of things such as to send the voice data to a distribution list or have the voice data converted to text data and e-mailed to a distribution list, to name a few. The command information specifies how the voice data is to be handled. Handling of the voice data can be accomplished in a wide variety of ways, depending on the capabilities of the voice processing device 16. The assigning of the command information and identification information to the voice data by the application 12 is represented by step 32.

Figure 4:
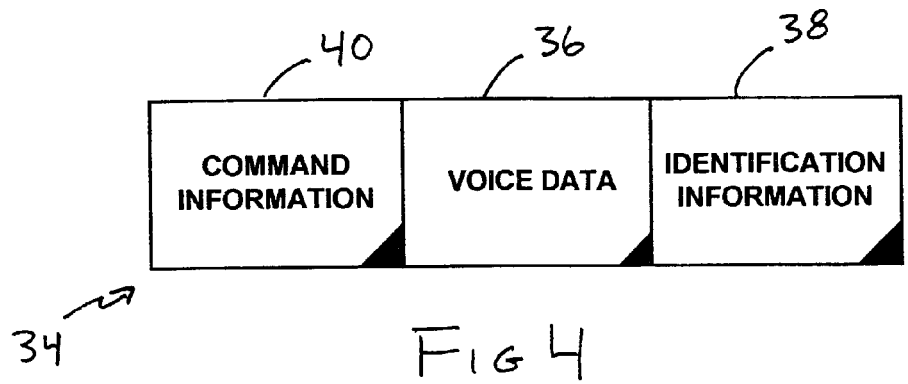
FIG. 4 is a simplified representation of command information, voice data, and identification information that is wrapped in an envelope provided by an application shown in FIG. 1.

FIG. 4 represents an application envelope of data 34 that is provided by the application 12 to the application processing device 14. In an exemplary embodiment, the envelope 34 includes voice data 36, identification information 38 and command information 40. This data is packaged in an envelope 34 that is passed to the application processing device 14 as represented by step 40 in FIG. 3. As discussed previously with respect to FIG. 1, the envelope information 34 can be passed from the application 12 to the application processing device 14 using a variety of techniques for passing data including using a wireless link or an electrical or optical connection.

Figure 5:
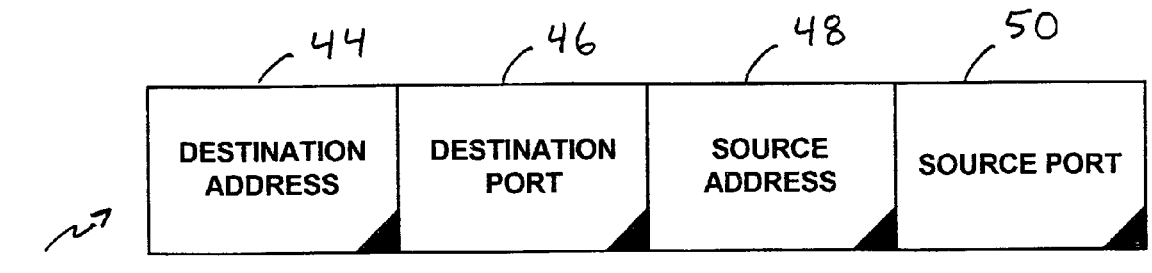
FIG. 5 is a simplified representation of a header that includes destination address, source address, destination port, and source port used to post information by the application processing device shown in FIG. 1.

The application processing device 14 sends the envelope information 34 to the voice processing device 16 as represented by step 42. The envelope information 34 can be sent in a wide variety of ways including an Internet connection, a wireless link, a satellite connection, or some form of hardwired connection such as a telephone connection. In the exemplary embodiment, the application processing device 14 attaches a header 42 and includes this header with a payload containing the envelope information 34. In the exemplary embodiment, a protocol for transferring information between the application processing device 14 and the voice processing device 16 is the SOAP protocol and HTTP extension framework. In the exemplary embodiment, the header 42, includes a destination address 44, a destination port 46, a source address 48, and a source port 50 as shown in FIG. 5. The destination address and destination port corresponds to a corresponding address and port of the voice processing device 16. The source address and the source port corresponds to an address and port associated with the application processing device 14.

The voice processing device 16 receives the header 42 containing the envelope 34, as payload as represented by step 52. The voice processing device 16 acknowledges receipt of the payload thereby allowing the application processing device 14 to disconnect from the voice processing device 16.

There are some inherent delays in the sending of voice data from the application 12 to the application processing device 14. These delays are due to the billing of input and output buffers as well as overhead, required in establishing connection between the application 12 and the application processing device 14. Once the application processing device 14 receives data and establishes a connection with the voice processing device 16, this voice data can be streamed in a real time manner from the application processing device 14 to the voice processing device 16. Therefore, it is possible for a longer dictation or relatively large voice data files to have a connection between the application 12 and application processing device 14 as well as simultaneously between the application processing device 14 and the voice processing device 16 as data is passed from the application 12 to the voice processing device 16. Because the flow of data between the application processing device 14 and the voice processing device 16 for this interconnect connection is typically sufficiently high bandwidth to support continuous speech. This connection will be referred to herein as "real time."

Once the voice processing device 16 receives the voice data from the application 12, the voice processing device 16 performs those functions specified by the command information 40 as represented by step 54 in FIG. 3. As discussed previously, the voice processing device 16 may be capable of providing a wide variety of functions in addition to converting voice data into text data. Once the voice data is converted into text data, the voice processing device 16 updates status to reflex that this command has been completed. As discussed previously, the conversion of voice data to text data can be accomplished by the voice processing device 16 itself or this function can be off-loaded to the transcriptor 20.

Figure 6:
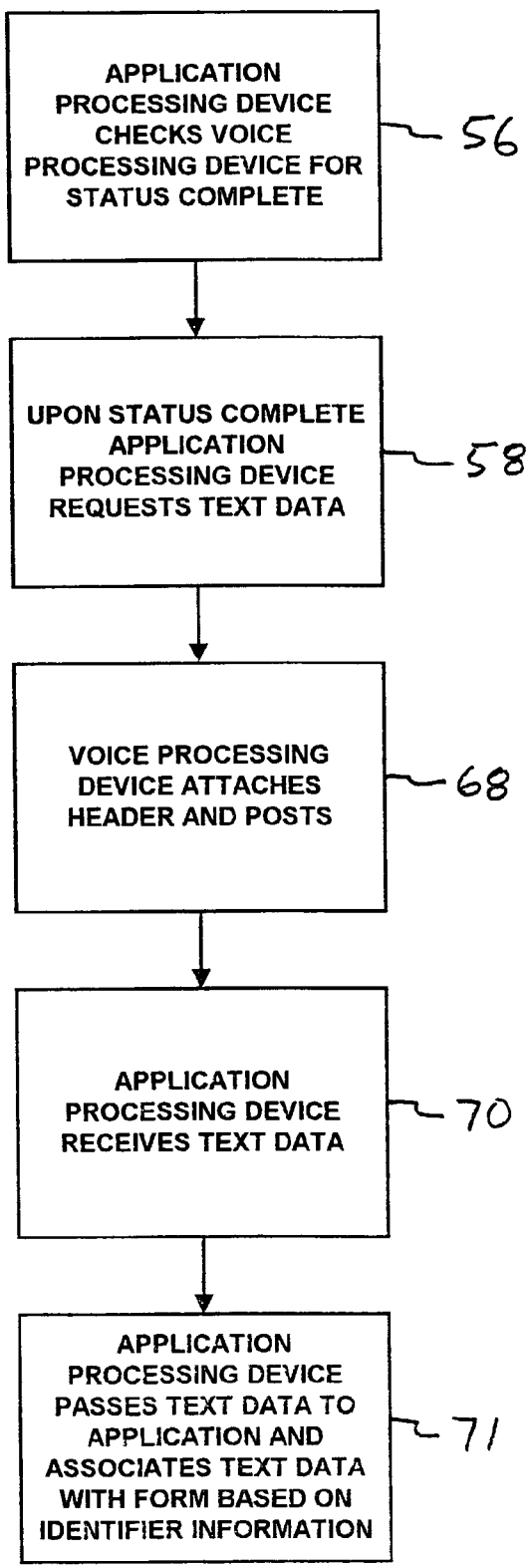
FIG. 6 is a simplified flow diagram representing the flow of text data from the voice processing device to the application, which associates the text data with the form.

FIG. 6 represents the method of transferring text data from the voice processing device 16 back to the application 12. As discussed previously, in the exemplary embodiment, the application processing device 14 acts as a client and the voice processing device 16 acts as a server in a server client relationship. However, in the case where the voice processing device 16 acts as a client, the voice processing device 16 can initiate connection with the application processing device 14 when the text data is ready. However, in the case where the voice processing device 16 is acting as a server, then text data cannot be passed from the voice processing device 16 to the application processing device 14 until the application processing device 14 polls the voice processing device 16 and determines from the status that text data is ready as represented by step 56. Once text data is ready, the application processing device 14 makes a request for the text data from the voice processing device 16 as represented by step 58.

Figure 7:
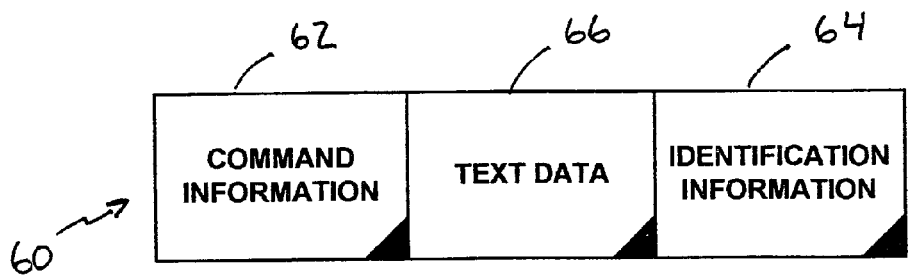
FIG. 7 is a simplified representation of the command information, identification information and text data provided to the application by the application processing device shown in FIG. 1.

The voice processing device 16 then prepares an envelope 60 and header for posting as represented by step 68. The envelope information shown in FIG. 7 is similar to the envelope 60 sent previously by the application processing device 14 shown in FIG. 4 except that the voice data 36 has been replaced by text data 66. The envelope 60 contains identification information 64 so that the application 12 can associate the text data 66 with the proper form, also included in the envelope 60, as command information 62.

Prior to sending the envelope 60 from the voice processing device 16 to the application processing device 14, the voice processing device 16 prepares a header that is similar to the header used by the application processing device 14 to send information to the voice processing device 16 except that the destination address 44 and the source address 48 are swapped and the destination port 46 and the source port 50 are swapped. The voice processing device 16 posts the header and payload 60 as represented by step 68. In response to posting, the application processing device 14 receives the payload as represented by step 70 and acknowledges receipt.

The application processing device 14 passes the payload or envelope information, which includes text data, identifier information, and command information to the application 12 as represented by step 71. Once the application 12 receives the text data 66, identifier information 64, and command information 62, the application can then associate the text data to a particular form by using the identification information 64. The identification information 64 is used to tag voice data which leaves the application 12 and that tag data remains with the voice data even after this data is converted to text data so that the application 12 can properly associate the text data to the proper form.

In operation, the exemplary embodiment of the method and apparatus of the present invention will now be described with respect to a specific application that relates to medical dictation. In this application, the application 12 is a PDA that is operating a medical records application. It should be noted that a wide variety of other applications are also suitable for using the method and apparatus of the present invention. This exemplary application shown in FIG. 8 represents a patient's chart that the physician fills in after examining the patient. In this exemplary embodiment, the patient's chart is displayed on the display 72 of the PDA. The physician then selects a portion of the form in which they desire to enter voice data as represented by box 74. The physician dictates or speaks into a microphone associated with the PDA to capture voice data. Application software running on the PDA captures this voice data and attaches identification information for associating this voice data with this particular form. In this exemplary embodiment, the voice data is associated with Angela Abrams' patient chart under the basic form, six month checkup as well as the physician dictating the notes is identified so that the voice data is associated with the proper location and form.

This voice data is then sent from the application 12 to the application processing device 14 and then to the voice processing device 16. In the exemplary embodiment, the PDA is equipped with a wireless networking card for transferring this information in a wireless fashion to the application processing device 14.

The voice processing device 16 receives this voice data and command information and determines that a conversion from voice data to text is requested by the application 12. The voice processing device 16 sends the voice data to the transcriptor 20 for transcription. Once transcription is complete, the voice processing device 16 receives text data, which corresponds to the original voice data. This text data is sent from the voice processing device 16 to the application processing device 14 then on to the application 12 for the physician's PDA.

The display 72 associated with the physician's PDA in this exemplary embodiment shows that there are two dictations, each by Physician S. Lance. A first dictation performed on May 3, 2002, at 12:50 p.m. is represented by reference number 76 and a second dictation one minute later as represented by reference number 78. Upon reference number 78, the text data is displayed in a portion 74 for entering data. In addition, the voice data or dictation by the physician is played, as illustrated by the playback control 80 showing progress of the voice data as the actual voice data is played through a speaker. The physician can check the text data shown in entry portion 74 with the voice data that is played through the speaker to check for accuracy of the text data. The physician can edit the text data if there are any mistakes. Once the text data is approved by the physician, the physician can indicate that the text is approved by activating portion 82 on the touch screen.

Once the text is approved, an icon 84 appears next to the corresponding dictation to show that the text has been approved by the entering physician.

The method and apparatus of the exemplary embodiment of the present invention provides a technique for capturing voice data and tagging this voice data or associating the voice data with a particular form. The voice data is then uploaded to a voice processing device 16 for converting the voice data to text. The text data is then routed back and associated with the particular form, freeing the user from having to manually enter data into a form. This technique is well suited to a wide variety of professions where it is cost effective to free the professional from the data entry task. In addition, the technique of the present invention is well suited for applications where the data entry into forms is inconvenient such as various kinds of inspectors who are out at a remote site and don't have access to a keyboard for data entry. In this case, the voice data is captured, and once the user reaches a suitable location for uploading information to the application processing device 14, then this voice data is uploaded.

Finally, the technique of the present invention makes use of forms, which are currently in use. These forms are integrated into the application software of the application 12 and data can be entered. By making use of current forms, the workflow for a particular application does not need to be modified, thereby minimizing transition costs from manual entry of forms to this direct voice capture.

What is claimed is:

1. A method for processing voice data provided by an application program, the application program for inserting text into a form, the method comprising:

provising a header that is associated with the voice data for identifying a source address and port for an application processing device linked to the application program and identifying a destination address and port for a voice processing device for translating voice data to text data;

receiving voice data associated with the form within the application program;

assigning an identifier to the voice data, wherein the voice data has the identifier associated therewith to identify the form into which the text data is to be placed;

sending the voice data from the application processing device to the voice processing device;

translating the voice data to corresponding text data;

assigning the identifier to the text data, wherein the text data has the identifier associated therewith to identify the form into which the text data is to be placed;

providing a revised header that is associated with the text data for identifying a host address and port for the application processing device and identifying a source address and port for the voice processing device; and providing the text data and the identifier to the application program for associating the text data with the form.

2. The method of claim 1 wherein the voice data received includes an identifier for identifying the speaker of the voice data and wherein the text data is provided to the application program with the identifier.

3. The method of claim 1 wherein the voice data is sent to the application processing device in real time.

4. The method of claim 1 wherein the voice data is provided by a personal digital assistant (PDA) that is linked using a wireless link to the application processing device, the application processing device providing the voice data and identified in real time via an internet link.

5. The method of claim 1 wherein prior to receiving voice data associated with the form performing the steps of:

displaying a form having a request for information therein, the request for information having a user selectable portion;

selecting the user selectable portion and speaking the requested information wherein the requested information is captured as voice data; and tagging the voice data with an identifier for associating the voice data with the form.

6. A system for processing voice data comprising:

a processing device running an application program having a form associated therein for inserting text, the processing device configured to receive a voice signal, convert that voice signal into voice data, create an identifier associated with the voice data, assign an identifier to the voice data to associate the voice data to the form of the application program, assign command information for specifying processing of the voice data, and provide an application envelope containing the voice data, identifier and command information;

an application processing device configured for internet connection, the application processing device having a data link for receiving the application envelope in real time from the processing device, the application processing device configured to attach a header to the application envelope, and provide the header and application envelope via an internet connection; and a voice processing device configured for internet connection and configured to receive the header and application envelope in real time from the application processing device via the internet connection, and acknowledge receipt of the application envelope to permit the application device to disconnect from the internet connection;

wherein the header contains a source address and a source port for the application processing device and a destination address and destination port for the voice processing device, wherein the voice data is translated to corresponding text data according to the command information, wherein the identifier is assigned to the text data so the text data has the identifier associated therewith for identifying the form into which the text data is to be placed and the identifier is provided in a text envelope, along with the text data, wherein a revised header that is associated with the text data for identifying a host address and port for the application processing device and identifying a source address and port for the voice processing device is provided, and wherein the text envelope and the revised header is provided to the application program for associating the text data with the form.

7. The system for processing voice data of claim 6 wherein the voice processing device is configured for connection to transcription resources for conversion of voice data into text data, wherein the voice processing device is configured to receive text data from the transcription resources.

8. The system for processing voice data of claim 7 wherein the voice processing device is configured to provide the text envelope containing the text data, the identifier associating the text data to the application program, and command information for specifying processing of the text data, wherein the voice processing device is configured to attach a revised header to the text envelope, wherein the voice processing device is configured to send the revised header and text envelope to the application processing device via another internet connection, and wherein the application processing device is configured to pass the text data to the processing device.

9. The system for processing voice data of claim 6 wherein the processing device is a personal data assistant.

10. A computer-readable storage medium storing a computer program product that, when run in a voice-processing platform for processing voice data, the stored program executing the steps of:

receiving a header and envelope information from an internet connected voice data capture device running an application program having a form associated therein for inserting text, the header containing a destination address and a destination port for the voice processing platform, the header further including a source address and a source port for the voice data capture device, the envelope information containing voice data, an identifier for the application program to identify context of the voice data and command information for specifying processing of the voice data by the voice processing platform;

processing the voice data as specified by the command information to convert the voice data into text data, the text data is combined with the identifier to form revised envelope information and a revised header containing a destination address and a destination port for the voice data capture device, the header further including a source address and a source port for the voice processing system platform; and sending the revised envelope and the revised header to the application program for associating the text data with the form into which the text data is to be placed.

11. The computer-readable storage medium of claim 10 wherein posting the revised envelope is performed after receipt of a request from the Internet connected voice data capture device.

* * * * *

UNITED STATES PATENT AND TRADEMARK OFFICE
CERTIFICATE OF CORRECTION

PATENT NO. : 7,590,534 B2  Page 1 of 1
APPLICATION NO. : 10/144436
DATED : September 15, 2009
INVENTOR(S) : Danny James Vatland It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this

Twenty-first Day of September, 2010

David J. Kappos
*Director of the United States Patent and Trademark Office*